United States Patent
Tombelli

(10) Patent No.: US 11,383,605 B2
(45) Date of Patent: Jul. 12, 2022

(54) HYBRID CHARGING SYSTEM

(71) Applicant: ABB Schweiz AG, Baden (CH)

(72) Inventor: Fabio Tombelli, Delft (NL)

(73) Assignee: ABB SCHWEIZ AG, Baden (CH)

( * ) Notice: Subject to any disclaimer, the term of this patent is extended or adjusted under 35 U.S.C. 154(b) by 160 days.

(21) Appl. No.: 16/751,570

(22) Filed: Jan. 24, 2020

(65) Prior Publication Data

US 2020/0156489 A1    May 21, 2020

Related U.S. Application Data

(63) Continuation of application No. PCT/EP2018/070451, filed on Jul. 27, 2018.

(30) Foreign Application Priority Data

Jul. 28, 2017    (EP) .................................... 17183865

(51) Int. Cl.
| | |
|---|---|
| *B60L 53/14* | (2019.01) |
| *B60L 53/122* | (2019.01) |
| *B60L 53/18* | (2019.01) |
| *H02J 7/02* | (2016.01) |
| *B60L 53/126* | (2019.01) |
| *B60L 53/60* | (2019.01) |

(52) U.S. Cl.
CPC ............. *B60L 53/14* (2019.02); *B60L 53/122* (2019.02); *B60L 53/126* (2019.02); *B60L 53/18* (2019.02); *H02J 7/02* (2013.01); *B60L 53/60* (2019.02)

(58) Field of Classification Search
CPC ............................... B60L 53/18; B60L 53/122
See application file for complete search history.

(56) References Cited

U.S. PATENT DOCUMENTS

| | | |
|---|---|---|
| 2013/0285602 A1 | 10/2013 | Nergaard et al. |
| 2014/0062394 A1 | 3/2014 | Khan et al. |

(Continued)

FOREIGN PATENT DOCUMENTS

| | | |
|---|---|---|
| EP | 2431213 A1 | 3/2012 |
| EP | 2717414 A1 | 4/2014 |
| EP | 2774800 A1 | 9/2014 |

(Continued)

OTHER PUBLICATIONS

Machine translation of WO-2018030830-A1 (Year: 2021).*

(Continued)

*Primary Examiner* — David V Henze-Gongola
(74) *Attorney, Agent, or Firm* — Greenberg Traurig, LLP

(57) ABSTRACT

A hybrid charging system for electric vehicles includes an AC-to-DC converter connectable to an electric AC grid; a transformer interconnected with the AC-to-AC converter with a primary winding; a secondary side AC-to-DC converter interconnected with a secondary winding of the transformer and for providing a DC current for power transfer to an electric vehicle via a cable; a cable connected to the secondary side AC-to-DC converter for providing a DC current for power transfer to an electric vehicle; and a first inductive coil interconnected with the AC-to-AC converter and for inductively coupling to a second inductive coil for power transfer to an electric vehicle via an air gap.

19 Claims, 5 Drawing Sheets

(56) References Cited

U.S. PATENT DOCUMENTS

2017/0072807 A1    3/2017  Matsumoto et al.
2017/0240055 A1*   8/2017  Nguyen .................. B60L 53/20

FOREIGN PATENT DOCUMENTS

| JP | 10136588 A * | 5/1998 | ............ B60L 53/122 |
| JP | H10136588 A | 5/1998 | |
| JP | H11252810 A | 9/1999 | |
| JP | 2007336710 A | 12/2007 | |
| JP | 2008220130 A | 9/2008 | |
| JP | 2010213535 A | 9/2010 | |
| JP | 2013223271 A | 10/2013 | |
| JP | 2013240206 A | 11/2013 | |
| WO | 2016019463 A1 | 2/2016 | |
| WO | WO-2018030830 A1 * | 2/2018 | .............. H02J 50/12 |

OTHER PUBLICATIONS

Machine translation of JP-10136588-A (Year: 2021).*
European Patent Office, International Search Report & Written Opinion issued in corresponding Application No. PCT/EP2018/070451, dated Jan. 4, 2019, 19 pp.

* cited by examiner

HYBRID CHARGING SYSTEM

FIELD OF THE INVENTION

The invention relates to the field of electric vehicles. In particular, the invention relates to a hybrid charging system for electric vehicles and to a charging system arrangement.

BACKGROUND OF THE INVENTION

Electric vehicles may be charged via wired or wireless power transfer. Wireless power transfer via two inductively coupled coils, which form an air transformer, is in direct competition with wired power transfer that in the moment seems to be more reliable and cost effective. However, in the recent years, for wireless power transfer, the transfer distance at kilowatts power level increased from several millimeters to several hundred millimeters with a grid to load efficiency above 90%. These advances make wireless power transfer very attractive to charging of electric vehicles in both stationary and dynamic charging scenarios.

Even though in terms of functionality the two types of charging system are intrinsically different, they have some commonalities. Both types may comprise a two stage topology comprising an AC-to-DC converter and a DC-to-DC converter with an internal transformer. In the case of the wired topology, the transformer is part of the charging system, while in the wireless topology, the transformer is provided by the two inductively coupled coils. Thus, in the wireless case, the DC-to-DC converter is distributed between the charging system and the electric car to be charged.

WO 2016 019 463 A1 describes a charger capable of working work with wireless and wired charging technologies. However, no specific topologies are disclosed.

EP 2 717 414 A1 shows a vehicle bound charging system, which can be connected to an AC power source and which is adapted for power transfer via an air gap.

US 2013 0 285 602 A1 shows a multi-mode battery charger, which is provided in an electric vehicle and which comprises a coil for receiving AC power via an air gap and a socket for receiving DC power. The coil is connected via a rectifier with a DC link, to which the socket is connected via a boost converter.

US 2014 0 062 394 A1 shows a charging system in an electric vehicle, which may be charged via a connection to an AC grid or via an air gap. A coil of the electric vehicle for air gap charging is connected via a circuit containing relays with a winding of a transformer.

US 2017 0 072 807 A1 shows a charging device in an electric vehicle, which may be charged via a connection to an AC grid or via an air gap. A coil of the electric vehicle for air gap charging is connected via a switch and a capacitor with a winding of a transformer.

DESCRIPTION OF THE INVENTION

It is an objective of the invention to provide a simple and economic charging system providing wired and wireless charging capability.

This objective is achieved by the subject-matter of the independent claims. Further exemplary embodiments are evident from the dependent claims and the following description.

An aspect of the invention relates to a hybrid charging system for electric vehicles. In this context, the term "hybrid" may refer to a charging system that is adapted for charging with the wired and wireless power transfer. An electric vehicle may be a street vehicle that may be driven with an electric motor, which is supplied by a battery. The hybrid charging system may be used for charging the battery. Also a hybrid vehicle, i.e. a vehicle with a combustion engine and an electrical motor, may be seen as an electric vehicle.

According to an embodiment of the invention, the hybrid charging system comprises an AC-to-AC converter connectable to an electric AC grid; a transformer interconnected with the AC-to-AC converter with a primary winding; a secondary side AC-to-DC converter interconnected with a secondary winding of the transformer; a cable connected to the secondary side AC-to-DC converter for providing a DC current for power transfer to an electric vehicle, for example a first electric vehicle; and a first inductive coil interconnected with the AC-to-AC converter and for inductively coupling to a second inductive coil for power transfer to an electric vehicle, for example a second electric vehicle, via an air gap.

The hybrid charging system may be seen as a multi-mode charging system capable of delivering power through wired and wireless power transfer. The hybrid charging system may be part of a stationary charging station and/or the AC-to-AC converter, the transformer, the secondary side AC-to-DC converter, and the first inductive coil may be a stationary system. Here, stationary may mean that the corresponding components are rigidly connected to the ground (for example via a housing) and/or are not part of an electric vehicle.

The hybrid charging system may share components that are used for wired and wireless charging. One AC-to-AC converter, which may comprise an AC-to-DC converter and a DC-to-AC converter, may be interconnected with both the transformer and the first inductive coil. The DC-to-AC converter, the transformer and the secondary side AC-to-DC converter may be seen as a first DC-to-DC converter for wired charging. The DC-to-AC converter, the inductively coupled first and second coils and an AC-to-DC converter provided in an electric vehicle may be seen as a second DC-to-DC converter for wireless charging via the air transformer formed by the inductively coupled first and second coils.

It has to be noted that the first and second DC-to-DC converters, which share their primary side converter, both are galvanic separated converters. The galvanic separation for the wired topology part may be a highly coupled transformer.

Both DC-to-DC converters may have a primary side DC-to-AC converter, which may be adapted to generate a square voltage waveform on the primary side of the respective transformer.

The transformer for the wired topology part of the charging system may comprise a primary and a secondary winding that are inductively coupled via a common core. The AC-to-DC converter connected to the secondary winding may be interconnected with an electric vehicle via the cable. The cable may comprise a connector to be connected to a further connector of the electric vehicle. Such a connector, for example a plug, may be adapted for generating a detachable mechanic and electric connection with the electric vehicle. For example, the electric vehicle has a plug for such a cable, which then can directly charge a battery of the electric vehicle.

The galvanic separation for the wireless topology part may be a loosely coupled air transformer. Both first and second inductive coils may be flat coils that may be arranged substantially parallel with each other. For example, the first coil may be provided in a ground adapter below the electric vehicle, which has the second inductive coil in its underbody. With such an air transformer, energy may be transmitted across distances of several decimeter. A magnetic field that changes with time is generated with the first inductive coil. Part of the magnetic field flows through the second inductive coil and induces a current flow. The second inductive coil may be connected via a rectifier with the battery of the electric car, which then may be charged.

According to an embodiment of the invention, the hybrid charging system further comprises a first switch interconnected between the AC-to-AC converter and the transformer for disconnecting the primary winding of the transformer from the AC-to-AC-converter and a second switch interconnected between the AC-to-AC converter and the first inductive coil for disconnecting the first inductive coil from the AC-to-AC-converter.

According to an embodiment of the invention, the hybrid charging system further comprises a first switch interconnected between the AC-to-AC converter and the transformer for short-circuiting the primary winding of the transformer and a second switch interconnected between the AC-to-AC converter and the first inductive coil for short-circuiting the first inductive coil.

With such switches, either the transformer or the first inductive coil may be disconnected from the AC-to-AC transformer. In such a way, circulating currents may be avoided on the primary side of the charging system not used to transfer power. Even when none electric vehicle is connected with the respective part of the hybrid charging system, the AC current generated by the AC-to-AC converter may generate a circulating current in the primary winding or first inductive coil, respectively. This may generate extra losses, which may be avoided with switching the switches appropriately. The efficiency of the system may be increased with the switches.

It has to be noted that the first switch and the second switch may be two separate components but also may be provided by one component, such as a double switch. A double switch automatically may disconnect an input from the primary winding, when connecting the input to the first inductive coil, and vice versa.

According to an embodiment of the invention, the first switch is a normally closed switch and the second switch is a normally open switch, or vice versa. Tt may be that the hybrid charging system is normally in a wired charging mode. When an electric vehicle is connected to the charging cable, it can be charged without the necessity of detecting a demand for charging. A normally closed switch may be a switch that is closed, when no control signal is applied. A normally open switch may be a switch that is open, when no control signal is applied. Both switches may be mechanical switches.

On the other hand, when a controller receives a request for wireless charging, for example from a sensor that detects an electric vehicle or its second inductive coil near the first inductive coil, both switches may be switched and the electric vehicle may be charged via the first inductive coil.

It also may be that the electric vehicle is adapted to be charged by both types of topologies. In the case, there is a defect or problem with the wireless charging part of the hybrid charging system, the normally closed first switch and the normally open second switch provide the ability to charge the electric vehicle via the wire bound charging part.

According to an embodiment of the invention, the hybrid charging system further comprises a controller for opening and closing the first switch and the second switch, such that solely the transformer or solely the first inductive coil is connected with the AC-to-AC converter. The switches may be controlled by a controller that also may be responsible for controlling the semiconductor switches of the hybrid charging system. In particular, the semiconductor switches of the AC-to-AC converter.

When the first switch is a normally closed switch and the second switch is a normally open switch, only one control signal may be applied to both switches by the controller.

According to an embodiment of the invention, the controller is adapted for receiving a wireless communication signal indicating a charging type of an electric vehicle. For example, the controller may be connected to a wireless receiver, for example a WLAN receiver. The electric vehicle to be charged may send a charging signal with the respective charging type to the wireless receiver.

The controller may be adapted for opening and closing the first switch and the second switch according to the received charging type. I.e. when the charging type is "wired", then the switches may be switched, such that the primary winding of the transformer is connected to the AC-to-AC converter and such that the first inductive coil is disconnected from the AC-to-AC converter. When the charging type is "wireless", then the switches may be switched, such that the primary winding of the transformer is disconnected from the AC-to-AC converter and such that the first inductive coil is connected to the AC-to-AC converter.

According to an embodiment of the invention, the hybrid charging system further comprises a wireless receiver for receiving a charging signal from the electric vehicle with the second inductive coil. The controller may be adapted for disconnecting the transformer from the AC-to-AC converter and for connecting the first inductive coil to the AC-to-AC converter, when a charging signal is received by the wireless receiver. Electric vehicles equipped with wireless charging technology may have a wireless transmission link (such as a WLAN radio transmission link) with the charging system.

In general, the hybrid charging system may be adapted for automatically detecting the requested charging technology based on wireless communication between the electric vehicle and the hybrid charging system.

According to an embodiment of the invention, the hybrid charging system further comprises at least one compensation capacitor interconnected between the AC-to-AC converter and a connection point between the transformer and the first induction coil. The at least one compensation capacitor may be present for forming an oscillating circuit with the primary winding of the transformer or the first inductive coil. The oscillating circuit may be formed, when the corresponding switch is closed.

In other words, the compensation capacitor(s) of the wireless power transfer part of the hybrid charging system may be integrated and/or shared with the wired power transfer part. Sharing the compensation capacitors may save components and costs for the hybrid charging system.

The one or more compensation capacitors may be combined with further passive components, such as inductors and/or resistors to adapt the resonance and/or filter behaviour of the circuit.

It has to be noted that also the second inductive coil and a corresponding compensation capacitor may form such an oscillating circuit, which may be provided by an electric vehicle. The two oscillating circuits may be in resonance to improve the power transfer. In this way, an energy transmission with efficiency of up to 95% can be achieved.

In particular, the inductive power transfer via the first and second inductive coil may require a resonant circuit, since a large winding separation may have a relatively large leakage inductance and AC winding resistances. Furthermore, the magnetizing flux may be significantly reduced, which results in a much lower magnetizing inductance and mutual inductance. For the first and second inductive coil operating at a frequency well below its self-resonant frequency, one or more additional compensation capacitors are needed to form the resonant circuit in both sides.

A basic requirement for a compensation capacitor may be to resonate with the corresponding inductance, to provide the reactive power required for the inductances to generate an adequate magnetic field. For both inductive coils, the compensation capacitor(s) may minimize the input apparent power and/or may minimize the volt-ampere rating of the power supply.

According to an embodiment of the invention, the at least one compensation capacitor is connected between the AC-to-AC converter and the first switch for disconnecting the transformer from the AC-to-AC converter and the at least one compensation capacitor is connected between the AC-to-AC converter and the second switch for disconnecting the first inductive coil from the AC-to-AC converter.

According to an embodiment of the invention, the at least one compensation capacitor is connected in series with the primary winding of the transformer and in series with the first inductive coil and/or the at least one compensation capacitor is connected in parallel with the primary winding of the transformer and in parallel with the first inductive coil.

It may be possible that more than one compensation capacitor are present. For example, one compensation capacitor may be connected in series with the primary winding of the transformer and in series with the first inductive coil and one compensation capacitor may be connected in parallel with the primary winding of the transformer and in parallel with the first inductive coil.

According to an embodiment of the invention, the first inductive coil and the primary winding of the transformer are connected in parallel or in series, for example via switches, to outputs of the AC-to-AC converter. For example, the AC-to-AC converter may comprise a full-bridge converter with two phases, each of which provides an output of the AC-to-AC converter. Via the switches either the transformer or the first inductive coil may be supplied with power by switching the switches accordingly.

According to an embodiment of the invention, the first inductive coil is connected to a first output and a second output of the AC-to-AC converter and the primary winding of the transformer is connected to the second output and a third output of the AC-to-AC converter. For example, the AC-to-AC converter may comprise a full-bridge converter with three phases, each of which provides an output of the AC-to-AC converter. The half-bridges and/or phases of the full-bridge converter may be controlled, such that either the transformer or the first inductive coil or both the transformer and the first inductive coil are supplied with power.

According to an embodiment of the invention, the AC-to-AC converter comprises a grid side AC-to-DC converter and a primary side DC-to-AC converter. A DC link with a DC link capacitor may be interconnected between the AC-to-DC converter and the DC-to-AC converter. As already mentioned above, the primary side AC-to-DC converter and the following components (i.e. transformer part or inductive coil part) of each charging topology may be seen as DC-to-DC converter. This DC-to-DC converter may be connected via the DC link with the grid side AC-to-DC converter.

There are several possible topologies for the AC-to-DC converter and the DC-to-AC converter, which, however, are not limited by the following embodiments.

According to an embodiment of the invention, the DC-to-AC converter is a full-bridge converter. A full-bridge converter may comprise a half-bridge for each phase of the converter. A half-bridge may comprise two series-connected switching devices, such as transistors or thyristors. As mentioned above, the full-bridge converter may comprise two or three phases.

In general, the grid side AC-to-DC converter may be an active front end or passive front end. It may be a single phase or a three phase converter.

According to an embodiment of the invention, the AC-to-DC converter comprises a boost converter and/or a passive rectifier. A boost converter may comprise an inductance connected in series with a diode and switching device, such as a transistor or thyristor that is connected between the inductance and the diode. The passive rectifier may generate a DC voltage that is boosted by the boost converter.

According to an embodiment of the invention, the AC-to-DC converter comprises a full-bridge converter. It has to be noted that the AC-to-DC converter may be a one-phase or three-phase converter. The DC-to-AC converter may be a one-phase converter.

Furthermore, the AC-to-DC converter may comprise a passive input filter, which may be composed of inductances and/or capacitors.

Also the secondary side AC-to-DC converter may have different topologies, which are not limited by the embodiments described in the following. For example, the secondary side DC-to-AC converter may comprise a diode bridge rectifier and optionally a filter.

A further aspect of the invention relates to a charging system arrangement, which comprises a hybrid charging system as described in the above and in the following and two electric cars, which may be charged either by the wired topology or by the wireless topology.

A first electric vehicle with a second inductive coil may be adapted for being inductively coupled with the first inductive coil provided by the hybrid charging system, wherein the first electric vehicle is adapted for being charged by the hybrid charging system.

A second electric vehicle may be adapted for being connected with the hybrid charging system with a cable, wherein the second electric vehicle is adapted for being charged by the hybrid charging system.

The hybrid charging system may be adapted for charging the first electric vehicle and/or the second electric vehicle via the AC-to-AC converter. When only the first electric vehicle is connected to the hybrid charging system via a cable, the hybrid charging system may be switched via the first and second switch that the first electric vehicle is charged via the transformer and the secondary side AC-to-DC converter. The first inductive coil may be disconnected from the AC-to-AC converter.

When the second electric vehicle is positioned such that the first inductive coil and the second inductive coil are inductively coupled, a wireless sender of the electric car may inform the hybrid charging system that the second electric car is present for charging. In this case, the hybrid charging system may be switched via the first and second switch such that the second electric vehicle is charged via the first and second inductive coils. The transformer then may be disconnected from the AC-to-AC converter.

In the case of the first inductive coil and the transformer connected to three outputs of the AC-to-AC converter, the AC-to-AC converter and in particular a three-phase converter, which provides the three outputs may be switched, for example under the control of the controller, such that either the first electric vehicle or the second electric vehicle or both the first and second electric vehicles are charged via the AC-to-AC converter.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
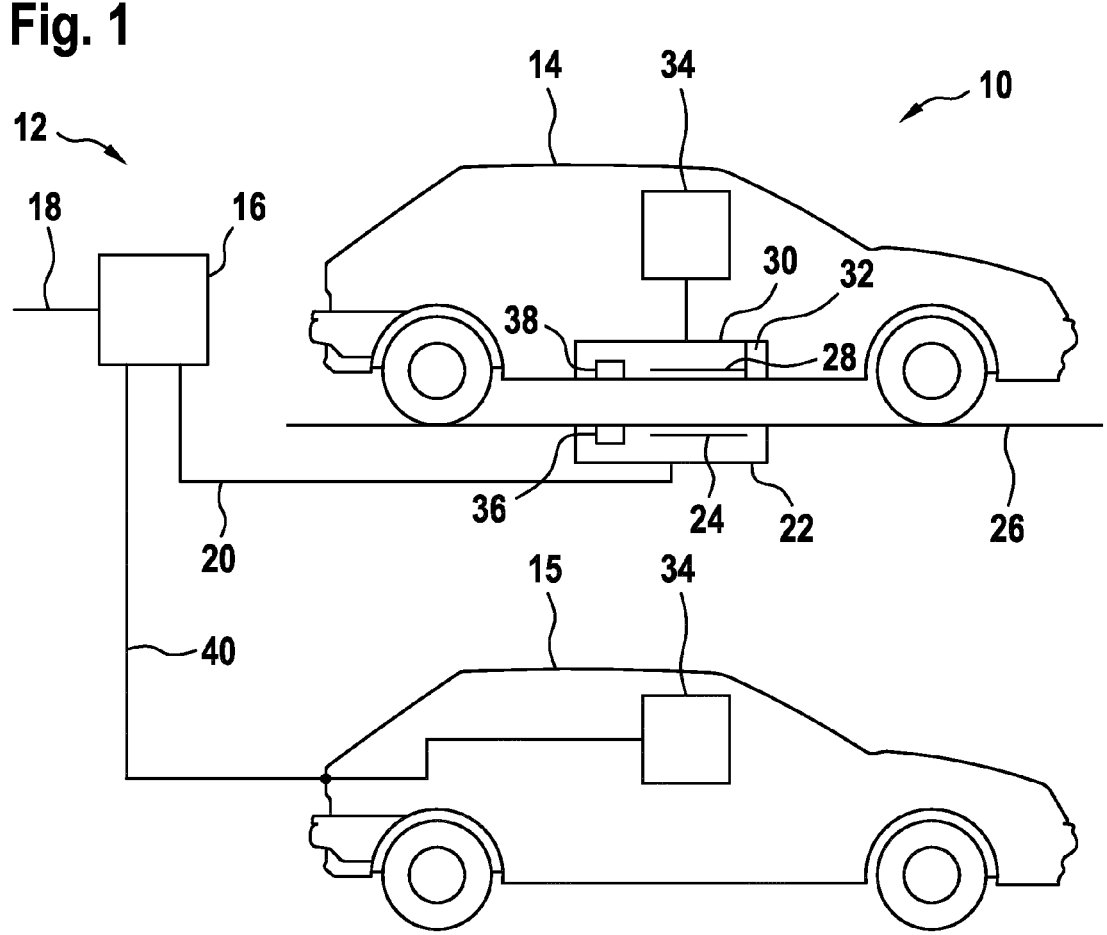
FIG. 1 schematically shows a charging system arrangement according to an embodiment of the invention.

FIG. 1 shows a charging system arrangement 10 comprising a hybrid charging system 12 and two electric vehicles 14, 15.

The hybrid charging system 12 comprises a main part 16, which is adapted for converting an AC current from an electrical grid 18 into an AC current of different, usually much higher frequency, which is supplied via a first cable 20 to a ground adapter 22, in which a first inductive coil 24 is arranged.

The main part 16, for example, may be connected to a wall. The ground 22 may be arranged below the electric vehicle 14 in a ground 26, for example in a parking lot.

When the electric vehicle 14 is positioned suitable above the ground adapter 22, the first inductive coil 24 is inductively coupled via an air gap with a second inductive coil 28 in an on-board charging device 30 of the electrical vehicle 14. The AC current induced in the second inductive coil 28 is rectified by an AC-to-DC converter 32 inside the electric vehicle 14 and supplied to a battery 34 of the electric vehicle 13.

The ground adapter 22 may comprise a wireless receiver 36 and the on-board charging device 30 may comprise a wireless sender 38 for indicating the main hybrid charging system 12 that an electric vehicle needs to be charged wirelessly.

The main part 16 of the hybrid charging system 12 is additionally adapted for converting the AC current from an electrical grid 18 into a DC current, which is supplied via a second cable 40 to the second electric vehicle 15, which battery 34 may be charged directly with the DC current. It has to be noted that it may be possible that the hybrid charging system 12 may be adapted for solely charging one of the electric vehicles 13, 15 at one time. It may be that only one electric vehicle 14, 15 is connected with the hybrid charging system 12.

Figure 2:
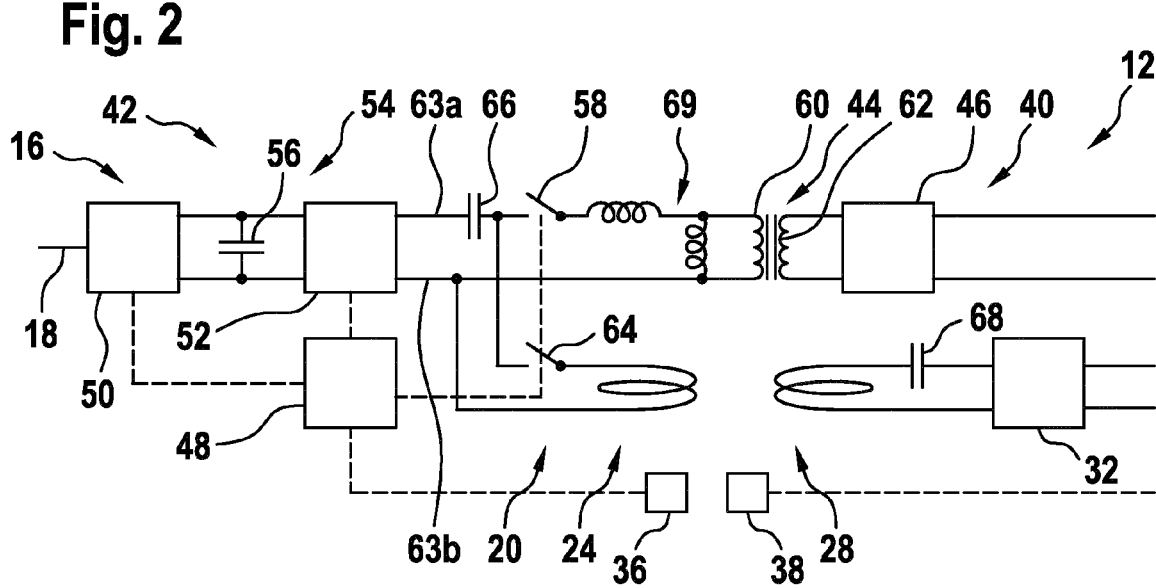
FIG. 2 schematically shows a hybrid charging system according to an embodiment of the invention.

FIG. 2 shows the wireless charging system 12 in more detail. The main part 16 comprises an AC-to-AC converter 42 that is interconnected via a transformer 44 with a secondary side AC-to-DC converter 46 and a controller 48 for controlling the AC-to-AC converter 42. In particular, the AC-to-AC converter 46 comprises a grid side AC-to-DC converter 50 and a primary side DC-to-AC converter 52, which are interconnected via a DC link 54 with a DC link capacitor 56.

A first switch 58 is connected between the AC-to-AC converter 42 and the transformer 44, such that a primary winding 60 of the transformer 44 can be disconnected from the AC-to-AC converter 42. The primary winding 60 of the transformer 44 is inductively coupled with a secondary winding 62 via a common core. The secondary winding is connected to the AC-to-DC converter 46, which is interconnected with the charging cable 40.

The first inductive coil 24 is connected via the cable 20 in parallel to a primary winding 60 to the AC-to-AC converter 42. Both the first inductive coil 24 and the primary winding 60 are connected in parallel to two outputs 63a, 63b of the AC-to-AC converter 42. These outputs 63a, 63b are provided by the primary side DC-to-AC converter 52. A second switch 64, which as the first switch 58 is arranged in the main part 16, is connected between the AC-to-AC converter 42 and the first inductive coil 24, such that the first inductive coil 24 can be disconnected from the AC-to-AC converter 42.

Furthermore, FIG. 2 shows a compensation capacitor 66, which is interconnected between the AC-to-AC converter 42 and the first switch 58 and the second switch 64.

The switches 58, 64 may be controlled by the controller 48 to be open or closed. In a wired charging state, the switch 58 is controlled to be closed and the switch 64 is controlled to be open. In a wireless charging state, the switch 58 is controlled to be open and the switch 64 is controlled to be closed. In both states, the compensation capacitor 64 forms a resonant circuit with the respective inductance, i.e. the primary winding 60 or the first inductive coil 24.

The switch 58 may be a normally closed switch and the switch 64 may be a normally open switch. In such a way, the controller 48 may only need one control signal to move the switches in the wired charging state or the wireless charging state.

It has to be noted that also the second inductive coil 28 of the electric vehicle 15 may be interconnected with the compensation capacitor 68, forming a resonant circuit with the second inductive coil 28. Furthermore, the primary winding 60 of the transformer 44 may be connected in parallel and/or in series with further inductors 69, which may be arranged between the switch 58 and the primary winding 60. These inductors 69 may form an LLC circuit with the capacitor 66.

In both the wired charging state and the wireless charging state, the controller controls switching devices of the AC-to-DC converter 50 to generate a DC current in the DC link 56 and controls switching devices of the DC-to-AC converter 52 to convert the DC current in the DC link 54 into the high frequency current. For example, the voltage in the grid 18 may have a voltage of 50 Hz or 60 Hz. On the other hand, the pulse width modulated current output by the AC-to-AC converter 42 may have a frequency of more than 10 kHz.

In the wired charging state, which is assumed by the hybrid charging system 12 without further information from the wireless receiver 36, the AC-to-DC converter 46 is supplied via the transformer 44 with the AC current from the AC-to-AC converter 42. The AC-to-DC converter 46 generates a DC current that is supplied to the electric vehicle 15 for charging its battery 34.

When an electric vehicle 14 is positioned above the ground adapter 22, the electric vehicle 14, with the wireless sender 38, may send a charging signal to the wireless receiver 36. The charging signal is received by the controller 48, which then switches the switches 58, 64 into the wireless charging state. The AC current from the AC-to-AC converter is supplied to the first inductive coil 24. A corresponding AC current is induced in the second inductive coil 28 and converted into a DC current by the AC-to-DC converter 32 of the electric vehicle 15.

In FIG. 2, the compensation capacitor 66 is connected in series with the primary winding 60 and the first inductive coil 24. The compensation capacitor 68 is connected in series with the second inductive coil 28.

Figure 3:
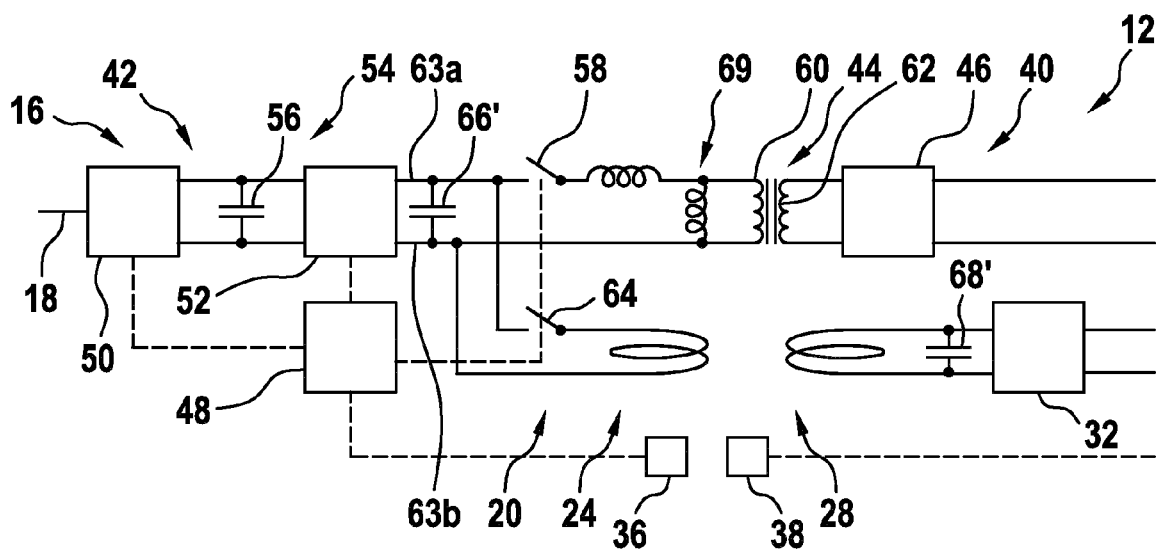
FIG. 3 schematically shows a hybrid charging system according to a further embodiment of the invention.

FIG. 3 shows a wireless charging system 12, which differs from the wireless charging system of FIG. 2 in that the compensation capacitor 66' is connected in parallel with the primary winding 60 and the first inductive coil 24. Furthermore, the compensation capacitor 68' is connected in parallel with the second inductive coil 28.

It has to be noted that the wireless charging system 12 may have both a compensation capacitor 66 in series and a compensation capacitor 66' in parallel to the primary winding 60 and the first inductive coil 24. The same applies to the compensation capacitors 68, 68' inside the electric vehicle 14. Furthermore, a compensation capacitor 66 (or 66') may be combined with a compensation capacitor 68' (or 68).

Figure 4:
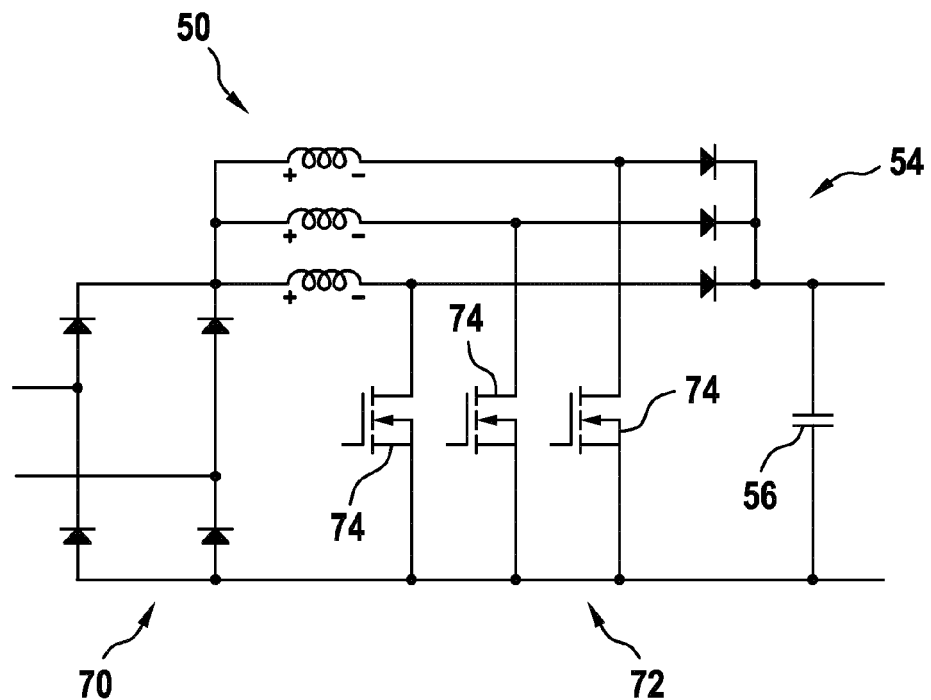
FIG. 4 shows a schematic circuit diagram for a grid side AC-to-DC converter of a hybrid charging system according to an embodiment of the invention.

FIG. 4 shows an example for an AC-to-DC converter 50, which is composed of a passive rectifier 70 and a boost converter 72. The passive rectifier 70 comprises two diode half-bridges. The boost converter 72 comprises three paralleled arms of an inductance series-connected with a diode and a switching device 74, which is connected between the inductance and the diode. The switching devices 74 may be controlled by the controller 48.

Figure 5:
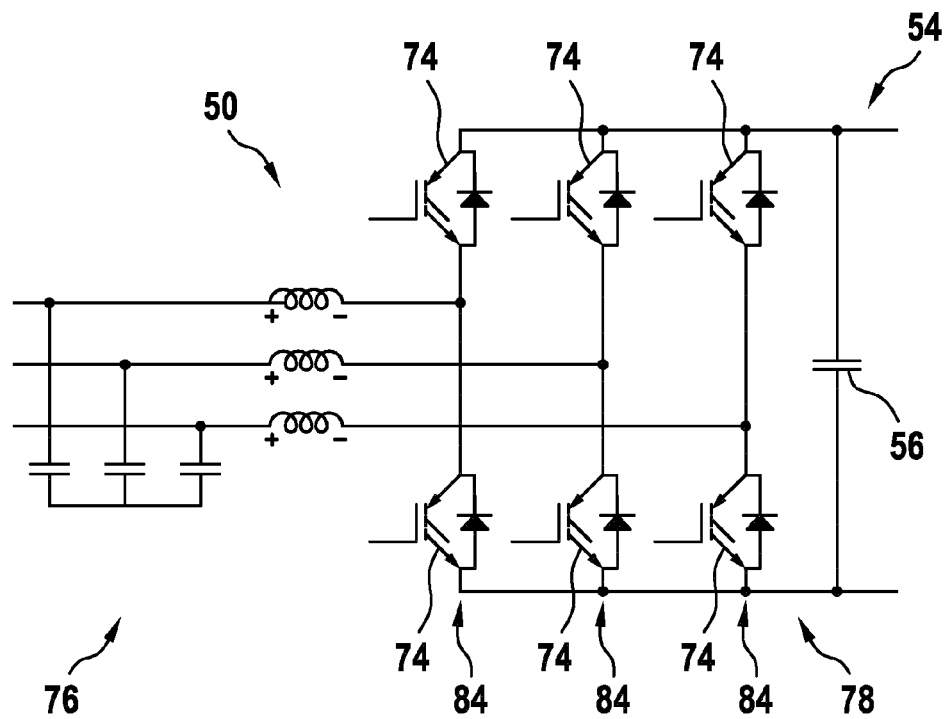
FIG. 5 shows a schematic circuit diagram for a further grid side AC-to-DC converter of a hybrid charging system according to an embodiment of the invention.

FIG. 5 shows a further example for an AC-to-DC converter 50, which is composed of a passive input filter 76 and a three-phase full-bridge converter 78. The passive input filter 76 comprises three single-phase LC-filters, which are star-connected via capacitors. The full-bridge converter 78 comprises three half-bridges 84 of series-connected switching devices 74. The switching devices 74 may be controlled by the controller 48. Each switching device may comprise a semiconductor switch.

Figure 6:
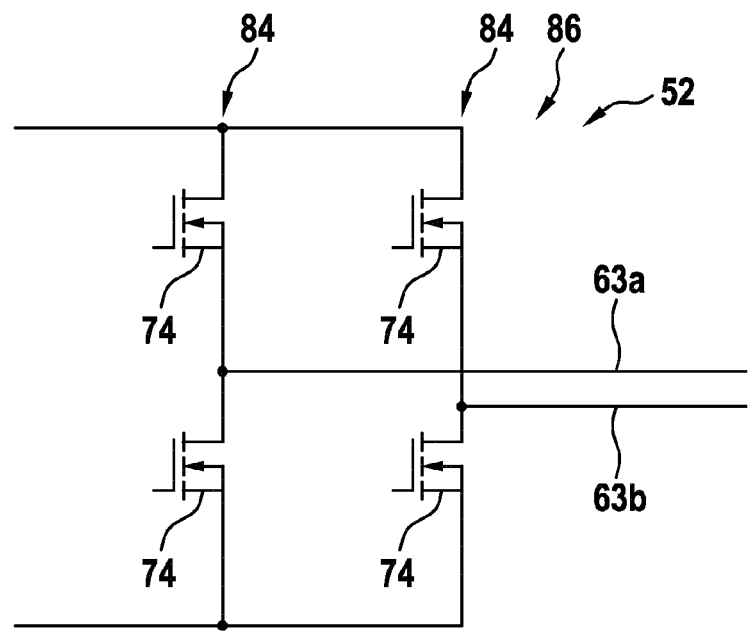
FIG. 6 shows a schematic circuit diagram for a DC-to-AC converter of a hybrid charging system according to an embodiment of the invention.

FIG. 6 shows an example for a DC-to-AC converter 52, which is a single-phase full-bridge converter 86. The DC-to-AC converter 52 comprises two half-bridges 84 of series-connected switching devices 74. The switching devices 74 may be controlled by the controller 48.

Figure 7:
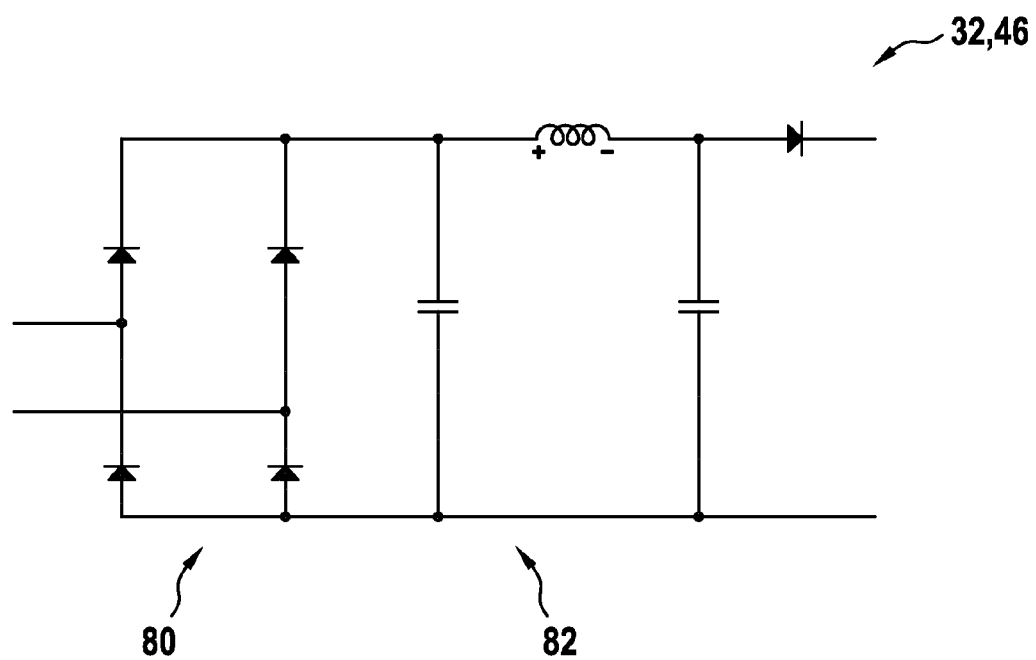
FIG. 7 shows a schematic circuit diagram for a secondary side AC-to-DC converter for a hybrid charging system according to an embodiment of the invention.

FIG. 7 shows an example for an AC-to-DC converter 46, which may be employed in the main part 16 and/or an example for an AC-to-DC converter 32, which may be employed in the on-board charging device 30. The AC-to-DC converter 46, 32 comprises a passive rectifier 80 composed of two diode half-bridges and a CLC output filter 82. A diode may prevent an inverse current flow from the battery 34 into the rectifier AC-to-DC converter 46, 32.

Figure 8:
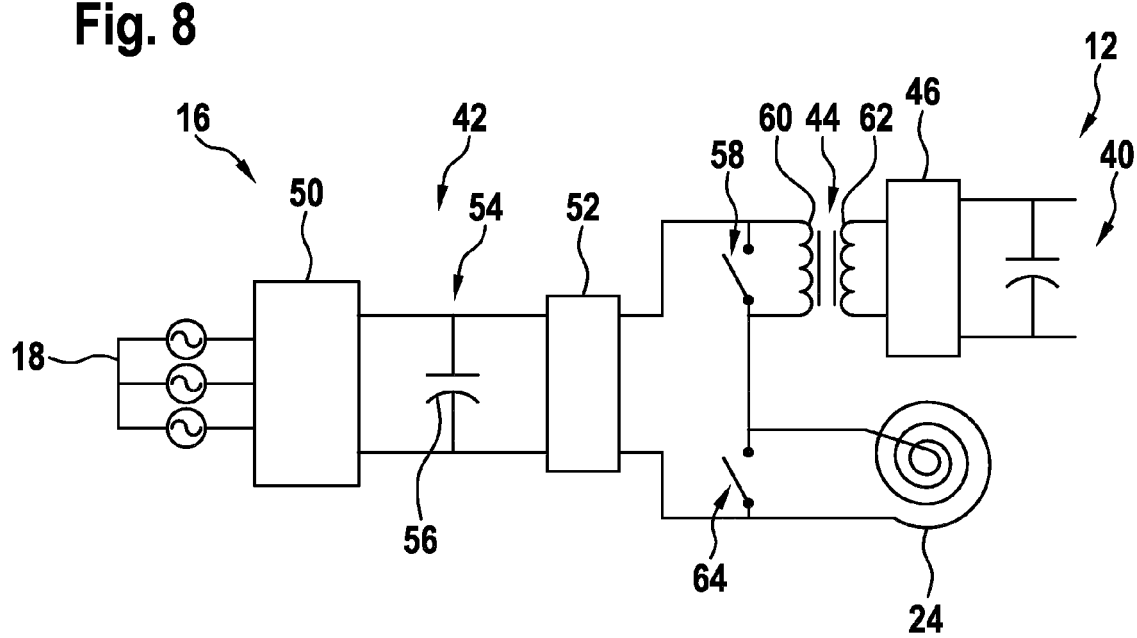
FIG. 8 schematically shows a hybrid charging system according to a further embodiment of the invention.

FIG. 8 shows a wireless charging system 12, which differs from the wireless charging system of FIG. 2 in the arrangement of the switches 58, 84. In FIG. 8, the primary winding 60 of the transformer 44 and the first inductive coil 64 are connected in series. The switch 58 is adapted for short-circuiting the primary winding 60 of the transformer 44 and the second switch 64 is adapted for short-circuiting the first inductive coil 64. The switch 58 may be a normally open switch and the switch 64 may be a normally close switch.

Figure 9:
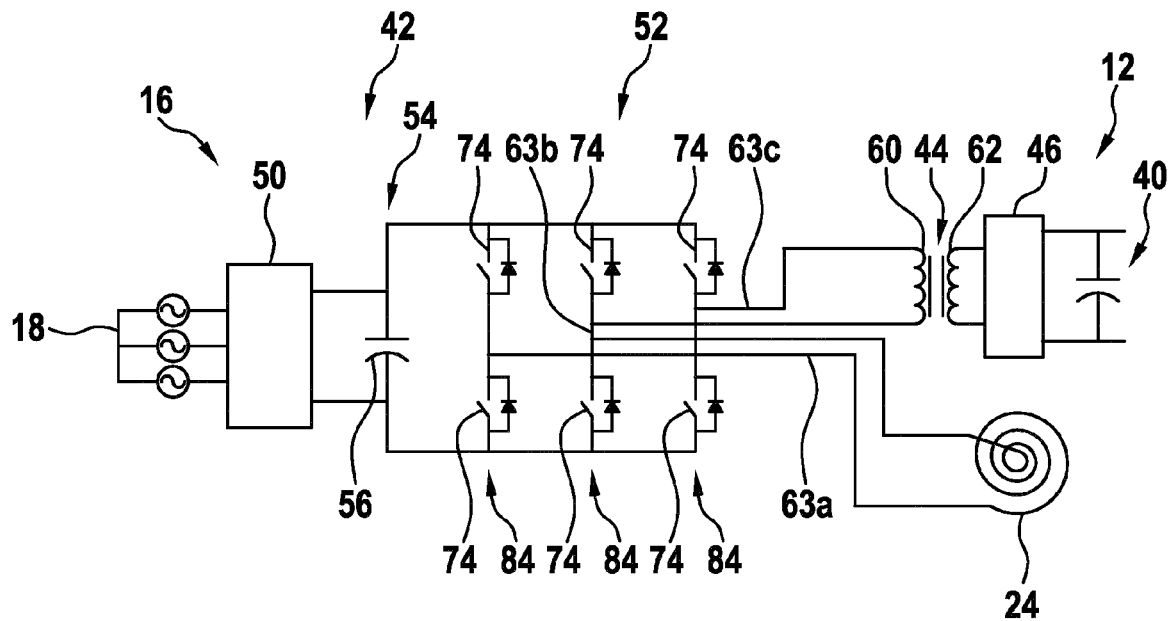
FIG. 9 schematically shows a hybrid charging system according to a further embodiment of the invention.

FIG. 9 shows a wireless charging system 12 with a primary side DC-to-AC converter 52, which is a three-phase bridge converter 88. The converter 88 comprises three half-bridges connected in parallel to the DC link 54. Each of the half-bridges provides an output 63a, 63b, 63c of the converter 88. The first inductive coil 24 is connected to a first output 63a and a second output 63b. The primary winding 60 of the transformer 44 is connected to the second output 63b and a third output 63c. In such a way, the controller 48 may control the converter 88, either to solely charge via the transformer 44 and/or the cable 40 or via the first inductive coil 24 or with both the cable 40 and the inductive coil 24.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 charging system arrangement
12 hybrid charging system
14 first electric vehicle
15 second electric vehicle
15 main part
16 electrical grid
18 first cable
20 ground adapter
24 first inductive coil
26 ground, parking lot
28 second inductive coil
30 on-board charging device
32 AC-to-DC converter
34 battery
36 wireless receiver
38 wireless sender
40 second cable
42 AC-to-AC converter
44 transformer 46 secondary side AC-to-DC converter
48 controller
50 grid side AC-to-DC converter
52 primary side DC-to-AC converter
54 DC link
56 DC link capacitor
58 first switch
60 primary winding
63 secondary winding
63a first output
63b second output
63c third output
64 second switch
66 compensating capacitor
66' compensating capacitor
68 compensating capacitor
68' compensating capacitor
69 inductor
70 passive rectifier
72 boost converter
74 switching device
76 input filter
78 three-phase full-bridge converter
80 passive rectifier
82 output filter
84 half-bridge
86 single-phase full-bridge converter
88 three-phase bridge converter

The invention claimed is:

1. A hybrid charging system for electric vehicles, the charging system comprising:
an AC-to-AC converter connectable to an electric AC grid;
a transformer interconnected with the AC-to-AC converter with a primary winding;
a secondary side AC-to-DC converter interconnected with a secondary winding of the transformer;
a cable connected to the secondary side AC-to-DC converter for providing a DC current for power transfer to an electric vehicle;
a first inductive coil interconnected with the AC-to-AC converter and for inductively coupling to a second inductive coil for power transfer to an electric vehicle via an air gap;
a first switch interconnected between the AC-to-AC converter and the transformer for short-circuiting the primary winding of the transformer; and
a second switch interconnected between the AC-to-AC converter and the first inductive coil for short-circuiting the first inductive coil.

2. The hybrid charging system of claim 1,
wherein the first switch is a normally closed switch and the second switch is a normally open switch; or
wherein the second switch is a normally closed switch and the first switch is a normally open switch.

3. The hybrid charging system of claim 1, further comprising:
a controller for opening and closing the first switch and the second switch, such that solely the transformer or solely the first inductive coil is connected with the AC-to-AC converter;
wherein the controller is adapted for receiving a wireless communication signal indicating a charging type of an electric vehicle;
wherein the controller is adapted for opening and closing the first switch and the second switch according to the received charging type.

4. The hybrid charging system of claim 1, wherein at least one compensation capacitor is connected between the AC-to-AC converter and the first switch and the at least one compensation capacitor is connected between the AC-to-AC converter and the second switch.

5. The hybrid charging system of claim 4, wherein the at least one compensation capacitor is connected in series with the primary winding of the transformer and in series with the first inductive coil.

6. The hybrid charging system of claim 4, wherein the at least one compensation capacitor is connected in parallel with the primary winding of the transformer and in parallel with the first inductive coil.

7. The hybrid charging system of claim 1, further comprising:
a wireless receiver for receiving a charging signal from the electric vehicle with the second inductive coil; and
a controller adapted for disconnecting the transformer from the AC-to-AC converter and for connecting the first inductive coil to the AC-to-AC converter, when a charging signal is received by the wireless receiver.

8. The hybrid charging system of claim 1, wherein the first inductive coil and the primary winding of the transformer are connected in parallel or in series to outputs of the AC-to-AC converter.

9. The hybrid charging system of claim 1, wherein the first inductive coil is connected to a first output and a second output of the AC-to-AC converter;
wherein the primary winding of the transformer is connected to the second output and a third output of the AC-to-AC converter.

10. The hybrid charging system of claim 1, wherein the AC-to-AC converter comprises a grid side AC-to-DC converter and a primary side DC-to-AC converter;
wherein a DC link with a DC link capacitor is interconnected between the AC-to-DC converter and the DC-to-AC converter.

11. The hybrid charging system of claim 10,
wherein the DC-to-AC converter comprises a full-bridge converter with two or three half-bridges providing outputs.

12. The hybrid charging system of claim 10, wherein the AC-to-DC converter comprises a boost converter and/or a passive rectifier; or
wherein the AC-to-DC converter comprises a full-bridge converter.

13. The hybrid charging system of claim 1, wherein the secondary side AC-to-DC converter comprises a diode bridge rectifier.

14. A charging system arrangement, comprising:
a hybrid charging system according to claim 1;
a first electric vehicle with a second inductive coil adapted for being inductively coupled with the first inductive coil provided by the hybrid charging system, wherein the first electric vehicle is adapted for being charged by the hybrid charging system; and
a second electric vehicle adapted for being connected with the hybrid charging system with a cable, wherein the second electric vehicle is adapted for being charged by the hybrid charging system;
wherein the hybrid charging system is adapted for charging the first electric vehicle and/or the second electric vehicle via the AC-to-AC converter.

15. The hybrid charging system of claim 2, further comprising:
  a controller for opening and closing the first switch and the second switch, such that solely the transformer or solely the first inductive coil is connected with the AC-to-AC converter;
  wherein the controller is adapted for receiving a wireless communication signal indicating a charging type of an electric vehicle;
  wherein the controller is adapted for opening and closing the first switch and the second switch according to the received charging type.

16. The hybrid charging system of claim 3, wherein at least one compensation capacitor is connected between the AC-to-AC converter and the first switch and the at least one compensation capacitor is connected between the AC-to-AC converter and the second switch.

17. The hybrid charging system of claim 16, wherein the at least one compensation capacitor is connected in series with the primary winding of the transformer and in series with the first inductive coil.

18. The hybrid charging system of claim 5, wherein the at least one compensation capacitor is connected in parallel with the primary winding of the transformer and in parallel with the first inductive coil.

19. The hybrid charging system of claim 11, wherein the AC-to-DC converter comprises a boost converter and/or a passive rectifier; or
  wherein the AC-to-DC converter comprises a full-bridge converter.

* * * * *